No. 810,989. PATENTED JAN. 30, 1906.
C. STEINERT.
DEVICE FOR TRANSPORTING GREEN MALT.
APPLICATION FILED MAY 25, 1904.
2 SHEETS—SHEET 1.
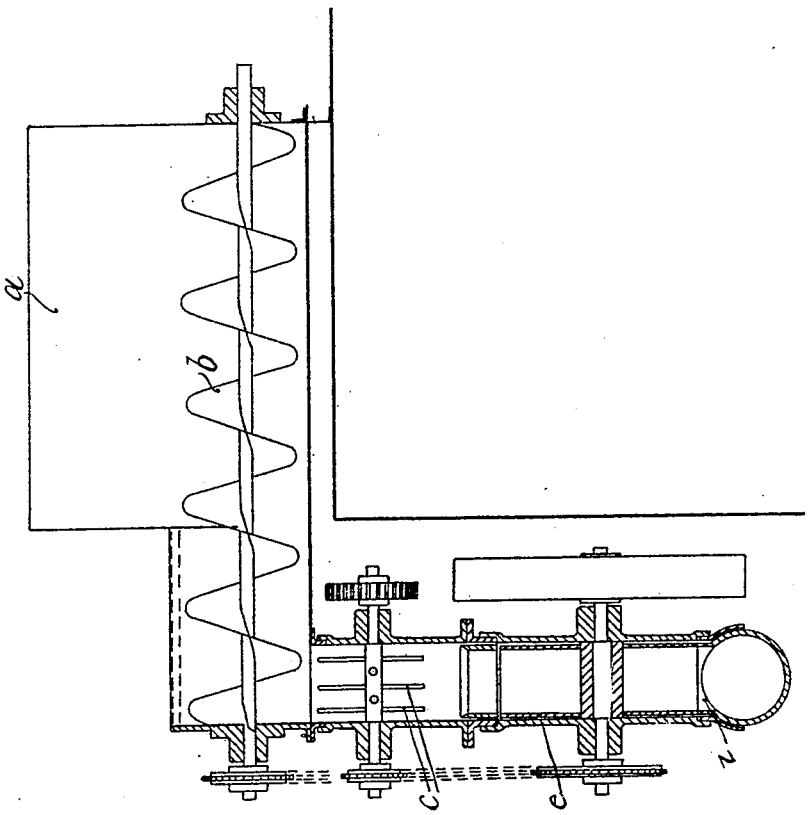
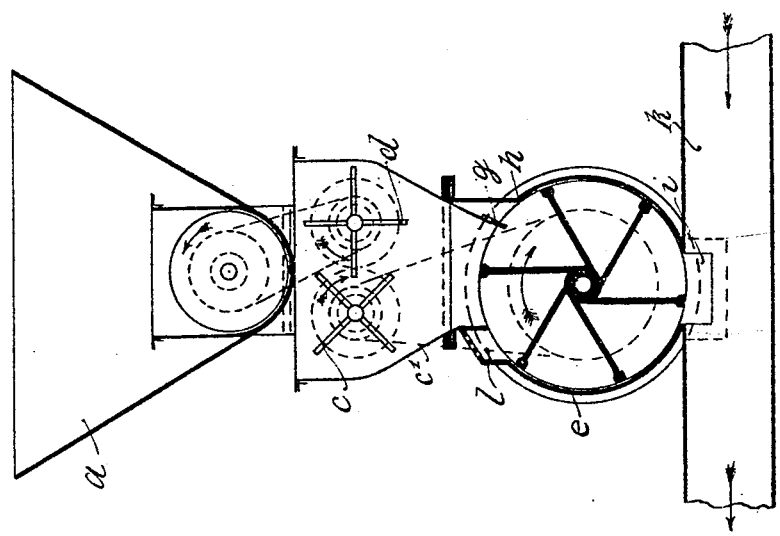
Witnesses:
Inventor:
Carl Steinert
by George Massie
his attorneys No. 810,989. PATENTED JAN. 30, 1906.
C. STEINERT.
DEVICE FOR TRANSPORTING GREEN MALT.
APPLICATION FILED MAY 25, 1904.

2 SHEETS—SHEET 2.

UNITED STATES PATENT OFFICE.

CARL STEINERT, OF MUNICH, GERMANY.

DEVICE FOR TRANSPORTING GREEN MALT.

No. 810,989.  Specification of Letters Patent.  Patented Jan. 30, 1906.

Application filed May 25, 1904. Serial No. 209,693.

*To all whom it may concern:*

Be it known that I, CARL STEINERT, a subject of the King of Prussia, German Emperor, residing at Munich, Bavaria, Germany, have invented certain new and useful Improvements in Devices for Transporting Green Malt; and I do hereby declare the following to be a full, clear, and exact description of the invention, such as will enable others skilled in the art to which it appertains to make and use the same.

The green malt has hitherto been transported to the couching-floor and drying-kilns by means of trucks, or by transport-buckets in some few cases. These methods of transportation are troublesome, and the malt is often damaged.

According to the present invention the green malt is transported pneumatically, either by means of compressed air or suction, from the floors to the kiln.

I am aware that pneumatic transporting devices have long been employed in connection with dry grain, &c.; but they have not to my knowledge been used in connection with green malt, because this substance has a tendency to ball when subjected to the slightest pressure, and thus it would be rendered untransportable. According to the present invention the green malt is passed to the pneumatic tubes in absolutely evenly-distributed quantities, and means are provided for preventing the malt from balling and also for preventing the injury of the malt by its being squeezed and bruised.

In order to render the present specification easily intelligible, reference is had to the accompanying drawings, in which similar letters of reference denote similar parts throughout the several views.

Figure 4:
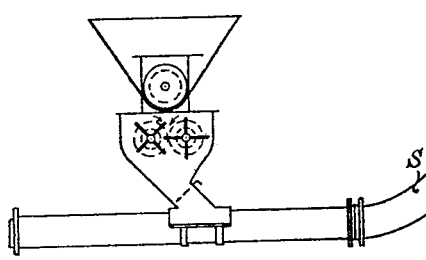
Figure 3:
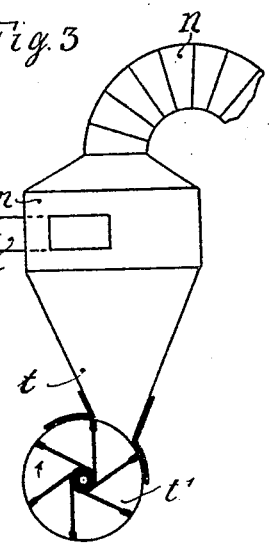

Figure 1 is a vertical cross-section, and Fig. 2 a longitudinal section, through the device employed for feeding the malt to the pneumatic tube, the arrangement being for compressed air. Fig. 3 is a side elevation, with the lower part in section, of a device for removing the malt from the tube when suction is employed; and Fig. 4 is an elevation of the device for feeding the malt into the tube when suction is employed.

Referring to Figs. 1 and 2, the feed-hopper $a$ is provided at the bottom with a short distributing-spiral $b$ or any other suitable feed device which must distribute the material absolutely evenly, such as a transport-band or the like, said spiral serving to feed the green malt filled into the hopper first to a loosening device consisting of two sets of rotating arms $c$ and $d$, said arms being adapted to intermesh when rotated, and after loosening the malt they allow it to fall into a feed-drum $e$, by means of which it is fed to the pneumatic-tube system $k$. The feed-drum $e$ is subdivided into a series of cells and at the inlet is provided with a scraper $g$, having its edge made of yielding material, such as felt or rubber, and serving to prevent the malt from being crushed at the corner $h$ of the drum-housing. The feed-drum is provided with end plates, so that the malt may not be crushed between the walls and the ends of the drum-housing. The drum-housing opens at $i$ into the pneumatic tube $k$ and is at the top in open communication with the housing $c'$ of the loosening-arms $c$ and $d$. As the cells of the feed-drum are filled with malt the air escapes at $l$ from each cell, and as the walls forming the cells close air-tightly against the interior of the drum-housing no air will enter the pneumatic-tube system, which may be supplied with air-pressure from any suitable source in the known manner. This class of transport devices is employed when the central malt-floors are at a considerable distance from the kilns, and the tube system has many inclines and curves. If, on the other hand, it is required to transport the malt from a series of floors to the kiln, the device illustrated in Figs. 3 and 4 is advantageously employed, in which the malt is transported by suction. In this case the delivering device, Fig. 3, consists of an air-tight recipient $m$, having three openings, one, $n$, for the suction apparatus, a lateral tangentially-arranged inlet-opening $o$ for the connection of the transport-tube, and a hopper-shaped lower outlet-opening $t$, having a delivery-drum $t'$ of similar construction to the feed-drum of Fig. 1, but operating to allow the malt to fall out of the recipient without letting the air in, as will be readily understood. This drum will be rotated by the weight of the falling malt in the direction of the arrow. The pneumatic tube $s$ leads from the malt-floor and is provided with a similar inlet device for the green malt as that described in reference to Figs. 1 and 2, but in this case without the inlet or feed drum. These inlet devices may be arranged on several branches of the tube system according to requirement, and the green malt may either be transported to the kiln or to the withering-floor. The suction in the tube system may be effected from any suitable source of power.

By means of the present invention the malt may be transported under conditions where it may be impossible to employ bucket-transports or transport-bands, and it has the great advantage that the malt is in no way injured or crushed. In addition to these advantages the malt is advantageously influenced by the current of air in that it will be partly dried in transport.

I claim as my invention—

1. In a device for transporting green malt, the combination, with a pneumatic-tube system, of a hopper to receive the malt, a screw conveyer leading therefrom, intermeshing disintegrating-arms at the discharge from the conveyer, and a feed-drum provided with buckets arranged between the disintegrator and pneumatic tube.

2. In a device for transporting green malt, the combination, with a pneumatic-tube system, of a feed-hopper, a screw conveyer leading therefrom, intermeshing disintegrating-arms at the discharge from the conveyer, a feed-drum provided with buckets arranged between the disintegrator and pneumatic tube, and a casing tightly fitting around the drum, there being air-vents from the casing.

3. In a device for transporting green malt, the combination, with a pneumatic-tube system, of a feed-hopper, a screw conveyer leading therefrom, intermeshing disintegrating-arms at the discharge from the conveyer, a feed-drum provided with buckets arranged between the disintegrator and pneumatic tube, a casing tightly fitting around the drum, there being air-vents from the casing, and a yielding scraper arranged to contact with the bucket edges.

In testimony whereof I affix my signature to this specification in the presence of two witnesses.

CARL STEINERT.

Witnesses:
ULYSSES J. BYWATER,
CHURCHILL HARVEY ELDER.